United States Patent [19]
Matsumoto

[11] Patent Number: 6,076,579
[45] Date of Patent: Jun. 20, 2000

[54] PNEUMATIC TIRE INCLUDING BLOCK SHAPED LANDS HAVING CHAMFERING

[75] Inventor: Hiroyuki Matsumoto, Kodaira, Japan

[73] Assignee: Bridgestone Corporation, Tokyo, Japan

[21] Appl. No.: 09/069,937

[22] Filed: Apr. 30, 1998

[30] Foreign Application Priority Data

May 2, 1997 [JP] Japan .................................... 9-114616

[51] Int. Cl.$^7$ ...................................................... B60C 11/11
[52] U.S. Cl. ...................................... 152/209.15; 152/902
[58] Field of Search ........................... 152/209.1, 209.15, 152/209.18, 902

[56] References Cited

U.S. PATENT DOCUMENTS

| | | | |
|---|---|---|---|
| 1,522,448 | 1/1925 | Harig | 152/209.15 |
| 4,690,189 | 9/1987 | Bradisse et al. | 152/209.15 |
| 4,722,378 | 2/1988 | Carolla et al. | 152/209.15 |
| 5,109,903 | 5/1992 | Watanabe et al. | 152/209.15 |
| 5,293,918 | 3/1994 | Tsuda et al. | 152/209.15 |
| 5,609,699 | 3/1997 | Himuro | 152/209.15 |
| 5,690,761 | 11/1997 | Masaoka | 152/209.1 |
| 5,707,461 | 1/1998 | Himuro | 152/209.1 |
| 5,746,849 | 5/1998 | Hutson et al. | |
| 5,885,384 | 3/1999 | Himuro | |

FOREIGN PATENT DOCUMENTS

| | | |
|---|---|---|
| 246 995 | 11/1987 | European Pat. Off. . |
| 356 369 | 2/1990 | European Pat. Off. . |
| 512 825 | 11/1992 | European Pat. Off. . |
| 602989 | 6/1994 | European Pat. Off. . |
| 2 520 303 | 7/1983 | France . |
| 29 31 628 | 2/1980 | Germany . |
| 64-22601 | 1/1989 | Japan . |
| 2-179508 | 7/1990 | Japan . |
| 7-186623 | 7/1995 | Japan . |

*Primary Examiner*—Steven D. Maki
*Attorney, Agent, or Firm*—Sughrue, Mion, Zinn, Macpeak & Seas, PLLC

[57] ABSTRACT

A pneumatic tire comprises a tread portion having a plurality of block-shaped or rib-shaped lands defined by a plurality of tread grooves, wherein each edge portion of the same block-shaped or rib-shaped land located at a boundary between a ground contact region and a side wall of the block-shaped or rib-shaped land is subjected to chamfering convexly outward in a radial direction of the tire at a curvature varied in accordance with a distance from a given position of the block-shaped or rib-shaped land.

5 Claims, 7 Drawing Sheets

FIG_4

FIG_5

FIG_6

FIG_7a

FIG_7b

FIG_8a

FIG_8b

PNEUMATIC TIRE INCLUDING BLOCK SHAPED LANDS HAVING CHAMFERING

BACKGROUND OF THE INVENTION

1. Field of the Invention

This invention relates to a pneumatic tire having excellent all-over running performances such as traction and braking performances, cornering property and straight running stability and the like without sacrificing the other tire properties.

2. Description of Related Art

As a vehicle performs various behaviors such as straight running, cornering, deceleration and/or stop and the like, longitudinal force, lateral force and so on are applied to a tire from a road surface through a ground contact region, so that the tire is naturally required to have a rigidity durable to these forces. Also, the tire must have a sufficient gripping force against the road surface. By enhancing these forces all-over running performances such as traction and braking performances, cornering property, the straight running stability and the like can be improved.

In general, the gripping force of the tire against the road surface corresponds to friction force between the ground contact region of the tire and the road surface, so that the enhancement of the friction force makes the enhancement of the gripping force and hence improves the above running performances.

As a technique for enhancing the friction force, it is useful to conduct the improvement of a tread portion, concretely the improvement of a distribution of grooves (for example, circumferential grooves, lateral grooves, etc.) arranged in the tread portion, a shape of each groove, a shape of a land portion and the like.

However, the improvement of the tread portion (particularly, a tread pattern) has a large influence on drainage property, noise level, ride comfortability against vibrations, wear resistance and the like, so that it is most difficult to improve the running performance by the conventionally practiced improvement of the tread portion while maintaining the above properties.

Now, the inventor has made detailed investigations with respect to a state of contacting the tread portion with the road surface (concretely, a distribution of ground contact pressure) by using the conventional tire having a usual block pattern in order to improve the friction force between the ground contact region of the tire and the road surface.

As a result, it has been confirmed that when block-shaped lands located in different regions of the tread are compared with each other, the ground contact pressure of the block-shaped land located in each side region of the tread is higher than that of the block-shaped land located in a central region thereof, and in case of viewing only a block-shaped land, a contact pressure (ground contact pressure) at an edge portion of the block-shaped land is higher than that at the other portion thereof and particularly the concentration of ground contact pressure in the edge portion (block edge) becomes remarkable when a large friction force is generated.

From these facts, it has been confirmed that although the conventional tires have a difference in the ground contact pressure or the ground contact area, it tends to produce a portion of the block-shaped land insufficiently contacting with ground by applying external forces such as longitudinal force, lateral force and the like from different directions to the tire. The ground contact area of the tread portion as a whole for generating the above friction force is apt to be decreased and hence the sufficient friction force can not be generated.

Also, it has been confirmed that the tendency of concentrating the ground contact pressure in the edge portion of the block-shaped land becomes conspicuous when the edge portion is in a square state, i.e., at an initial wearing stage of the tire.

From the above, the inventor has thought that the friction force generated between the ground contact region of the tire and the road surface can effectively be enhanced by mitigating the concentration of the ground contact pressure in the edge portion of the block-shaped land to uniformize the ground contact pressure in each of the block-shaped lands.

Moreover, it is useful to chamfer the edge portion of the block-shaped land as means for uniformizing the ground contact pressure in the block-shaped land. As such a tire, there are known, for example, a tire wherein a curved or flat chamfered portion is formed in only edge portions of the block-shaped land corresponding to stepping-in side and kicking-out side of the tire (JP-A-64-22601 etc.) and a tire wherein all edge portions of the block-shaped land is chamfered at a uniform inclination angle over a full periphery thereof (JP-A-2-179508).

However, the former tire has an effect of mitigating the ground contact pressure in the edge portions of the block-shaped land corresponding to the stepping-in side and kicking-out side of the tire. However, when the lateral force and the like are applied to the tire, it can not sufficiently be mitigated to concentrate the ground contact pressure in an edge portion of the block-shaped land facing a circumferential main groove.

In the latter tire, all edge portions of the block-shaped land are chamfered at a uniform inclination angle over its full periphery, so that there is an effect of mitigating the concentration of the ground contact pressure in the edge portions of the block-shaped land as compared with a tire wherein all edge portions of the block-shaped land are not subjected to chamfering. However, since uniform chamfering is carried out over the full periphery of the block-shaped land, the ground contact area of the block-shaped land is largely decreased and hence the friction force can not effectively be generated likewise the former case.

SUMMARY OF THE INVENTION

The inventor has made further studies with respect to the distribution of the ground contact pressure on the edge portions of the block-shaped land for effectively enhancing the friction force and found that the ground contact pressure in the edge portion is proportional to a distance from a given position of the block-shaped land.

That is, the invention has been accomplished under a technical idea that when the edge portion of the block-shaped land is subjected to a chamfering at a curvature in accordance with the distance from the given position of the block-shaped land, the ground contact pressure in the block-shaped land can be uniformized to effectively enhance the friction force without so decreasing the ground contact area.

Similarly, it has been found that even in tires having zigzag rib-shaped lands, the friction force can effectively be enhanced when edge portions of the rib-shaped land are subjected to chamfering at a curvature in accordance with a distance from a given position of the rib-shaped land.

It is, therefore, an object of the invention to provide a pneumatic tire having excellent running performances such as braking performance, cornering property, straight running stability and the like without sacrificing the other tire properties by subjecting edge portions of divided lands to chamfering at a curvature in accordance with a distance from a given position of the land.

According to a first aspect of the invention, there is the provision of in a pneumatic tire comprising a tread portion having a plurality of block-shaped lands defined by a plurality of tread grooves formed in the tread portion, an improvement wherein each edge portion of the same block-shaped land located at a boundary between a ground contact region and a side wall of the block-shaped land is subjected to chamfering convexly outward in a radial direction of the tire at a plurality of curvatures continuously varied in accordance with a distance from a center position of the block-shaped land.

The term "tread groove" used herein means all grooves arranged in the tread portion and includes, for example, circumferential main grooves extending along the circumference of the tire, auxiliary grooves extending across the circumferential main grooves and the like.

Figure 9:
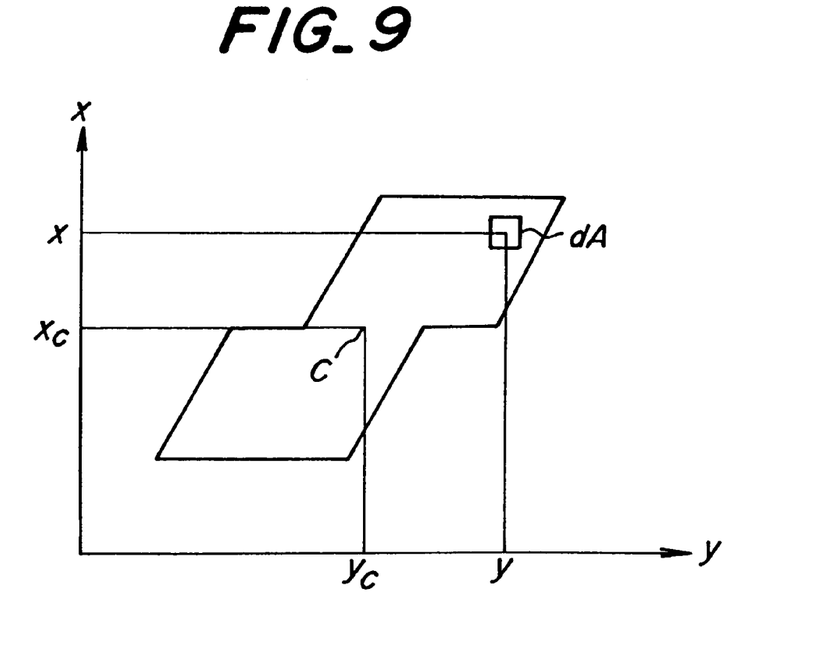
FIG. 9 is a diagrammatic view illustrating a center position of a block-shaped land.

Moreover, the term "center position of the block-shaped land" used herein means a position of centroid C viewed on a surface of the block-shaped land as shown in FIG. 9, i.e. a position defined by $x_c = 1/A \times \int x \, dA$ and $y_c = 1/A \times \int y \, dA$ when coordinates of the centroid are $(x_c, y_c)$, wherein x is the axis of coordinates in a circumferential direction of the tire, and y is the axis of coordinates in a widthwise direction thereof, and A is an area of the block-shaped land.

In the first aspect of the invention, it is preferable that the chamfering is carried out so as to increase or decrease a radius of curvature in the edge portion of the same block-shaped land in accordance with the distance from the center position of the block-shaped land, and that in case of the block-shaped lands located at different tread regions, the radius of chamfering curvature in the edge portion of the block-shaped land located at each side region of the tread is made larger than that in the edge portion of the block-shaped land located at the central region thereof.

According to a second aspect of the invention, there is the provision of in a pneumatic tire comprising a tread portion having a plurality of rib-shaped lands defined between at least two circumferential main grooves extending zigzag along the circumference of the tire and/or between the circumferential main groove and a tread end, an improvement wherein each edge portion of the same rib-shaped land located at a boundary between a ground contact region and a side wall of the rib-shaped land is subjected to chamfering convexly outward in a radial direction of the tire at a curvature varied in accordance with a distance vertically drawn from a circumference position of the tire equally dividing the rib-shaped land.

Figure 10:
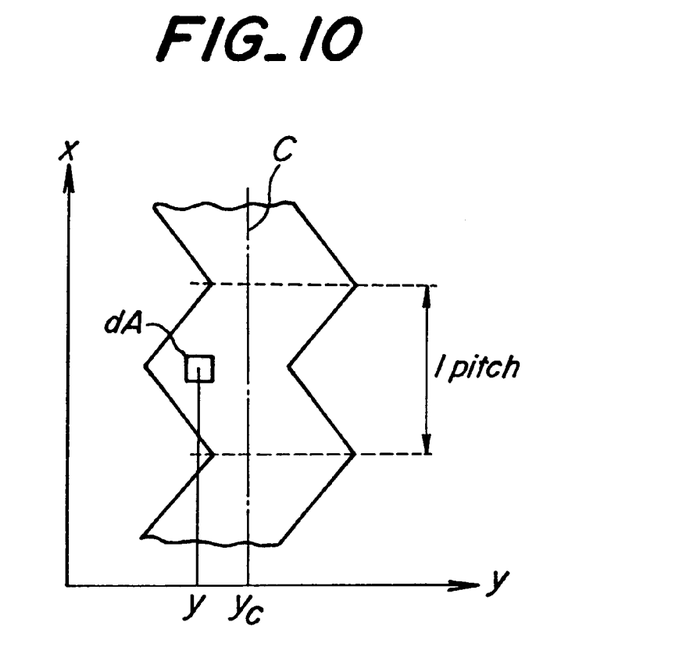
FIG. 10 is a diagrammatic view illustrating a circumference position of the tire equally dividing a rib-shaped land.

The term "circumference position of the tire equally dividing the rib-shaped land" used herein means a central position of the rib-shaped land in the widthwise direction thereof or a position of a neutral axis C of the rib-shaped land on the surface thereof as shown in FIG. 10, i.e. a position defined by $y_c = 1/A \times \int y \, dA$ as calculated every one pitch, wherein x is the axis of coordinates in a circumferential direction of the tire, and y is the axis of coordinates in a widthwise direction thereof, and A is an area of the rib-shaped land every a pitch.

In the second aspect of the invention, it is preferable that the chamfering is carried out to increase or decrease a radius of curvature in the edge portion of the same rib-shaped land in accordance with the distance vertically drawn from the circumference position of the tire, and that in case of the rib-shaped lands located at different tread regions, the radius of chamfering curvature in the edge portion of the rib-shaped land located at each side region of the tread is made larger than that in the edge portion of the rib-shaped land located at the central region thereof.

BRIEF DESCRIPTION OF THE DRAWINGS

The invention will be described with reference to the accompanying drawings, wherein:

FIG. 2b is a section view taken along a line IIb—IIb of FIG. 2a;

FIG. 2c is a section view taken along a line IIc—IIc of FIG. 2a;

FIG. 2d is a section view taken along a line IId—IId of FIG. 2a;

DESCRIPTION OF THE PREFERRED EMBODIMENTS

Figure 1:
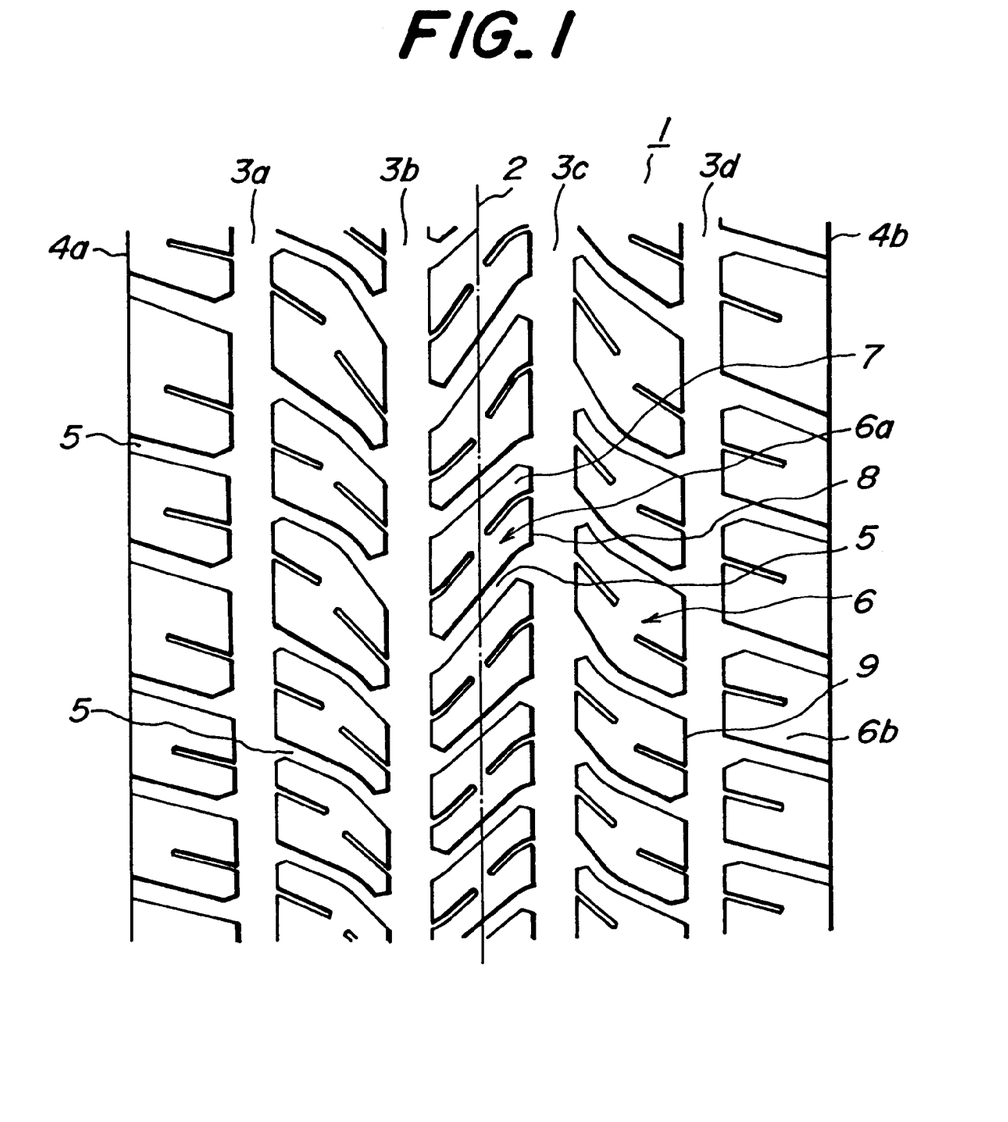
FIG. 1 is a diagrammatically partial plan view of a typical tread pattern in an embodiment of the pneumatic tire according to the invention.

In FIG. 1 is diagrammatically shown a typical tread pattern of the pneumatic tire according to the first aspect of the invention, in which numeral 1 is a tread portion, numeral 2 a circumference of the tire, numeral 3a–3d circumferential main grooves, numeral 4a and 4b tread ends in the widthwise direction of the tire, numeral 5 an auxiliary groove, numeral 6 a block-shaped land, and numeral 9 an edge portion of the block-shaped land.

In the illustrated tire, the tread portion 1 is divided into a plurality of block-shaped lands 6 to form a block pattern by arranging in the tread portion 1 at least two circumferential main grooves 3a–3d (four grooves in the illustrated embodiment) each extending along the circumference 2 of the tire, and a plurality of auxiliary grooves 5 between these circumferential main grooves 3a–3b, 3b–3c and 3c–3d and/or between the circumferential main groove 3a or 3d and the tread end 4a or 4b and communicating with these circumferential main grooves.

Figure 2A:
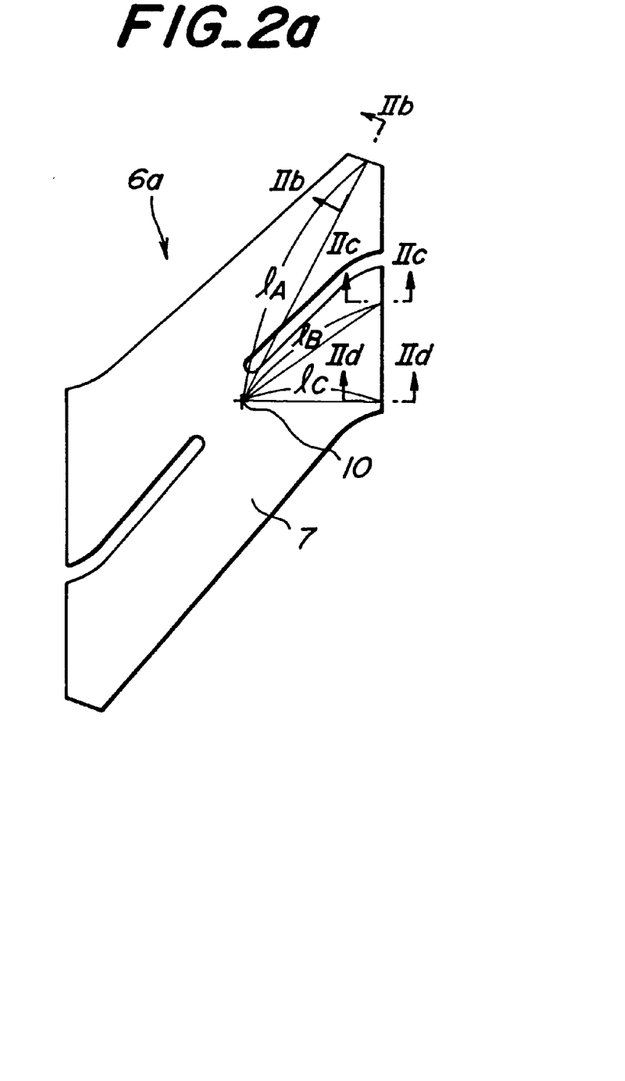
FIG. 2a is an enlarged view of one block-shaped land in the block pattern shown in FIG. 1.
Figure 2B:
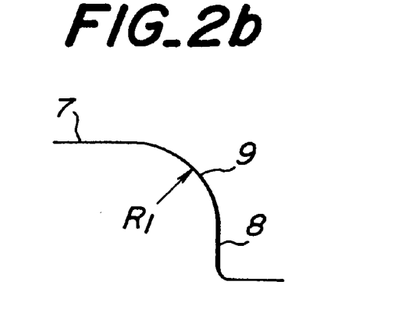
Figure 2C:
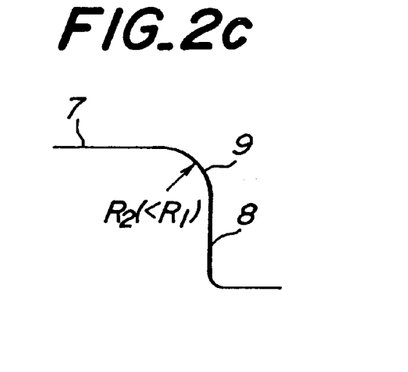
Figure 2D:
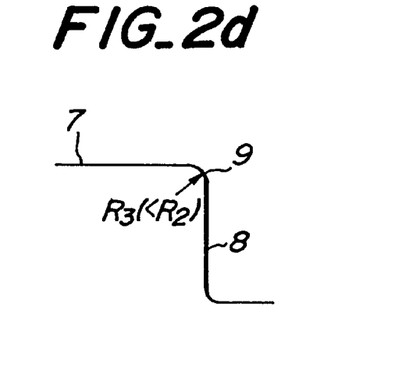

In FIG. 2a is enlargedly shown one block-shaped land 6a pulled out from the block-shaped lands constituting the tread portion shown in FIG. 1, and sections of lines IIb—IIb, IIc—IIc and IId—IId in FIG. 2a are shown in FIGS. 2b–2d, respectively. A main feature in the construction of the invention lies in that each edge portion 9 of the same block-shaped land 6a located at a boundary between a ground contact region 7 and a side wall 8 of the block-shaped land is subjected to chamfering convexly outward in a radial direction of the tire at a curvature varied in accordance with a distance from a center position 10 of the block-shaped land 6.

The details of accomplishing the invention will be described together with function below.

In general, the concentration of the ground contact pressure in the edge portion of the block-shaped land is considered to mainly depend on the following two reasons.

Figure 7A:
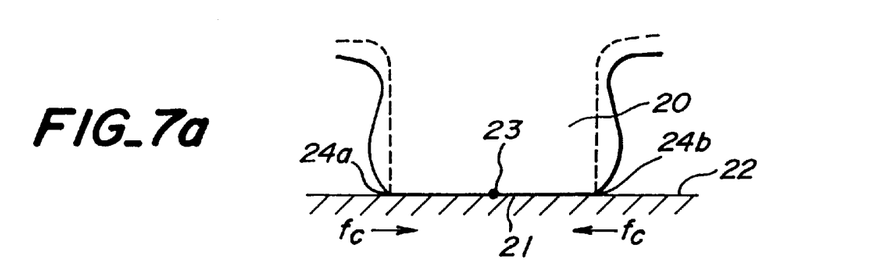
FIGS. 7a and 7b are diagrammatic views illustrating a state of concentrating a ground contact pressure in an edge portion of a block-shaped land.
Figure 7B:
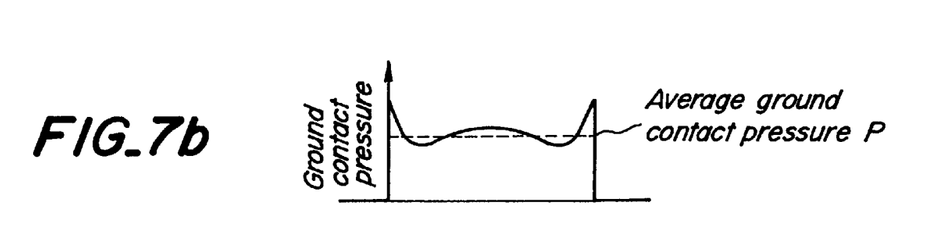

Namely, a first reason is a case of causing the above concentration when a load (in a vertical direction) is applied to the block-shaped land. As shown in FIG. 7a, the block-shaped land 20 having a shape shown by dotted lines tends to be spread in a ground contact region 21 by collapse deformation shown by a solid line under compression, but can not spread owing to the contact with a road surface 22 and hence shear strain fc is generated between the block-shaped land 20 and the road surface 22. This strain fc accumulates from a center position 23 of the block-shaped land 20 toward both edge portions 24a, 24b thereof and becomes maximum at both edge portions 24a, 24b. As a result, shear force applied to the block-shaped land 20 receives through the shear strain fc acts in a direction of standing up the edge portions 24a, 24b toward the center position 23 of the block-shaped land 20, and hence the ground contact pressure may concentrate in the edge portions 24a, 24b (as shown in FIG. 7b).

Figure 8A:
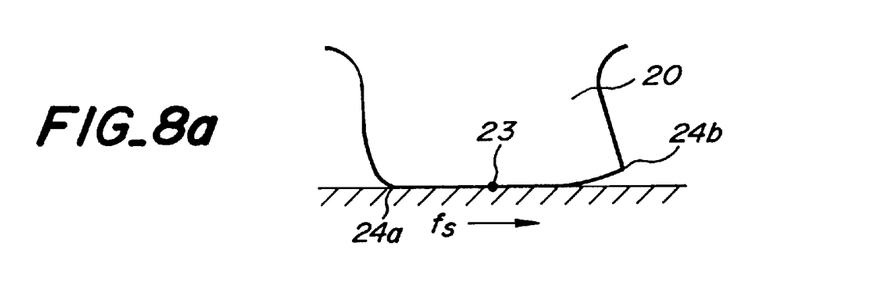
FIGS. 8a and 8b are diagrammatic views illustrating another state of concentrating the ground contact pressure in the edge portion of the block-shaped land.
Figure 8B:
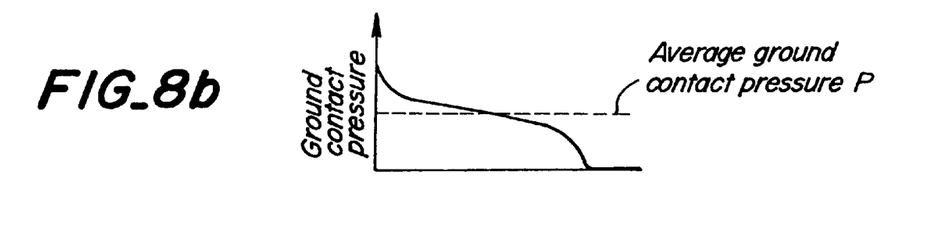

A second reason is a case of causing the above concentration when the longitudinal force, the lateral force or the like is applied to the block-shaped land 20. As shown in FIG. 8a, the bending deformation or shearing deformation of the block-shaped land 20 is caused by friction force fs (shear force) applied to the block-shaped land 20, and hence there is obtained a distribution of ground contact pressure that the ground contact pressure becomes high at the edge portion 24a corresponding to an input side of the friction force fs (as shown in FIG. 8b). In addition, the friction force fs acts in a direction of standing up the edge portion 24a at the input side, whereby the ground contact pressure is further concentrated in the edge portion.

In general, the block-shaped land in the ground contact region has various shapes ranging from a simple rectangular shape to a complicated shape.

The inventor has made studies with respect to the concentration of ground contact pressure in the edge portion of the block-shaped land in tires having various shapes in the block-shaped land and found that the ground contact pressure at the edge portion of the block-shaped land is proportional to a distance from a center position of the block-shaped land irrespectively of the shape of the block-shaped land.

This is coincident with the above first reason that when the load (in a vertical direction) is applied to the block-shaped land 20, the shear strain fc generated between the block-shaped land 20 and the road surface 22 accumulates from the center position 23 of the block-shaped land 20 to both edge portions 24a, 24b thereof, and the above second reason that when the longitudinal force or lateral force is applied to the block-shaped land 20, a deviation of the ground contact pressure due to the bending deformation or shearing deformation of the block-shaped land 20 gradually increases toward the edge portion 24a (at the input side) of the block-shaped land.

As seen from the above, in the first aspect of the invention, it is an essential feature that each edge portion 9 of the same block-shaped land 6a located at a boundary between the ground contact region 7 and the side wall 8 of the block-shaped land is subjected to chamfering convexly outward in a radial direction of the tire at a curvature varied in accordance with a distance from the center position 10 of the block-shaped land 6. In this way, the friction force between the ground contact region of the tire and the road surface can be effectively enhanced to improve the running performances. And also, there is caused no degradation of the other properties such as the drainage property and the like.

In order to more uniformize the ground contact pressure to further effectively enhance the friction force, it is preferable that radii of curvature in the chamfering $R_1$, $R_2$, $R_3$ are increased or decreased in correspondence with distances from the center position 10 of the block-shaped land 6 as shown in FIGS. 2a–2d.

Figure 3:
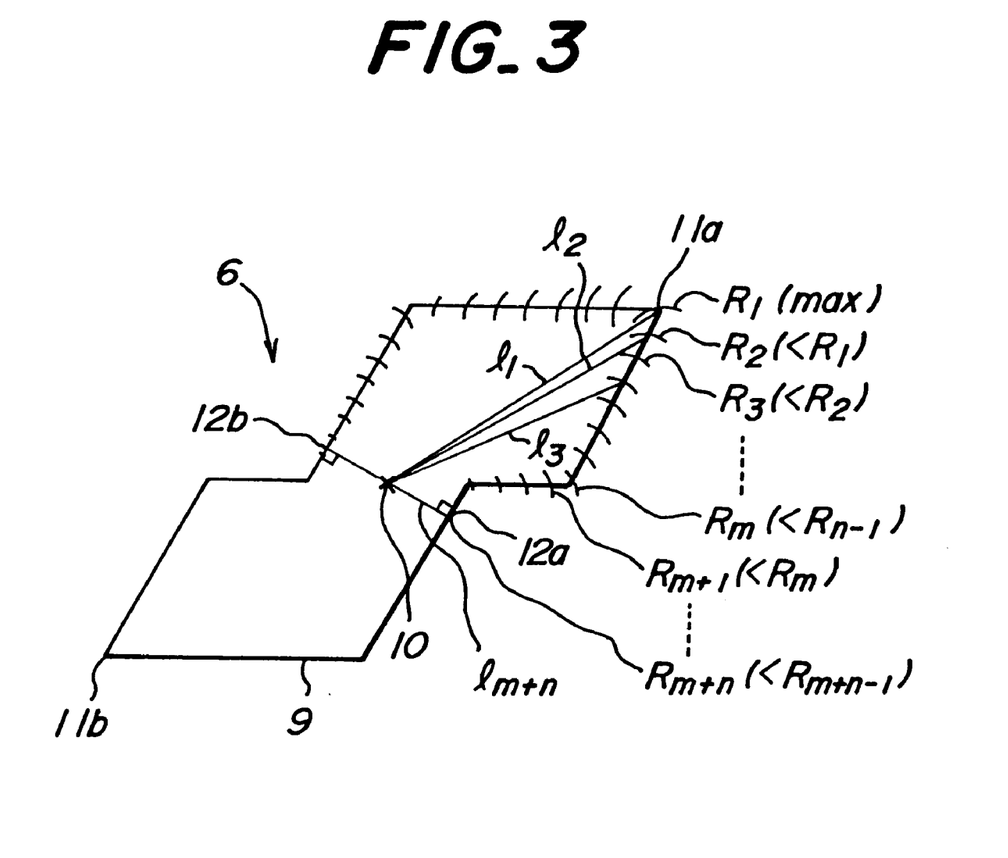
FIG. 3 is a diagrammatic view of another embodiment of the block-shaped land.

This will be described in detail by using another embodiment of the block-shaped land 6 as shown in FIG. 3. In this case, the edge portions 9 of the block-shaped land 6 are subjected to chamfering in such a manner that the radius R1 at corners 11a, 11b most apart from the center position 10 of the block-shaped land 6 (distance:$1_1$) is maximum and the radius of curvature in the edge portion of the block-shaped land 6 gradually decreases from the corners 11a, 11b toward positions 12a, 12b nearest to the center position 10 (distance:$1_{m+n}$) and the radius of curvature $R_{m+n}$ at the positions 12a, 12b is minimum.

In FIG. 3 are shown curvatures of the edge portions in only an upper half-part of the block-shaped land for convenience of explanation.

In order to more uniformize the ground contact pressure in the block-shaped lands, it is preferable that the radius of chamfering curvature in the edge portion of the block-shaped land 6b located at each side region of the tread is made larger than the radius of chamfering curvature in the edge portion of the block-shaped land 6a located at the central region thereof.

Figure 5:
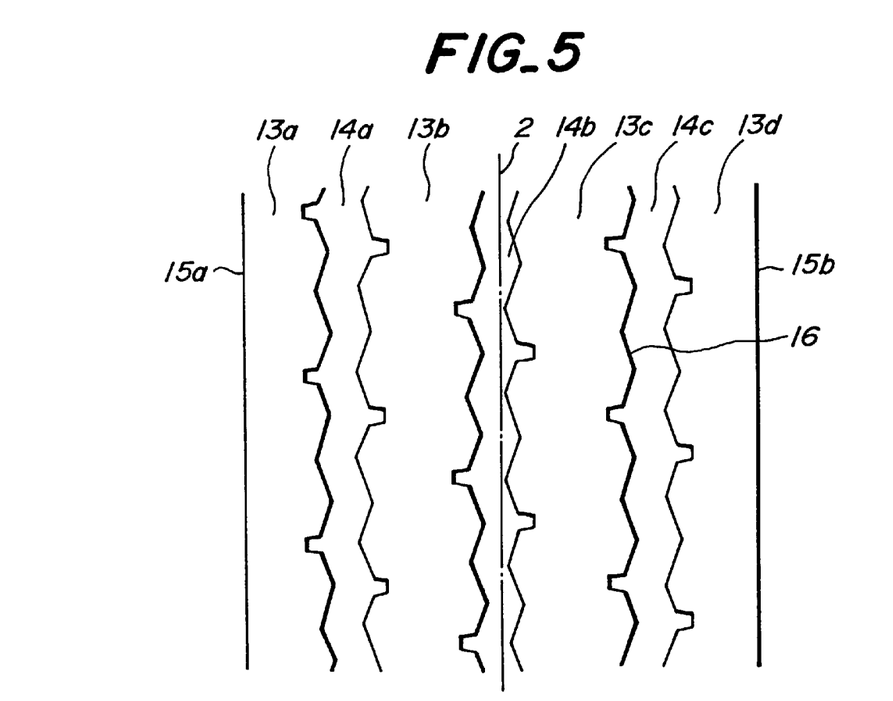
FIG. 5 is a diagrammatically partial plan view of a typical tread pattern in another embodiment of the pneumatic tire according to the invention.

In FIG. 5 is shown a typical tread pattern of the pneumatic tire according to the second aspect of the invention.

In the illustrated tire, the tread portion comprises at least two circumferential main grooves 14a–14c (three main grooves in the illustrated embodiment) extending zigzag along the circumference 2 of the tire and rib-shaped lands 13a–13d defined between these main grooves and between the main groove 14a or 14c and the tread end 15a or 15b.

Even in the second aspect of the invention, it has been found that The inventor also found that the friction force can effectively be enhanced by subjecting edge portions 16 of the rib-shaped land to chamfering at a curvature varied in accordance with a distance from a given position of the rib-shaped land.

Figure 6:
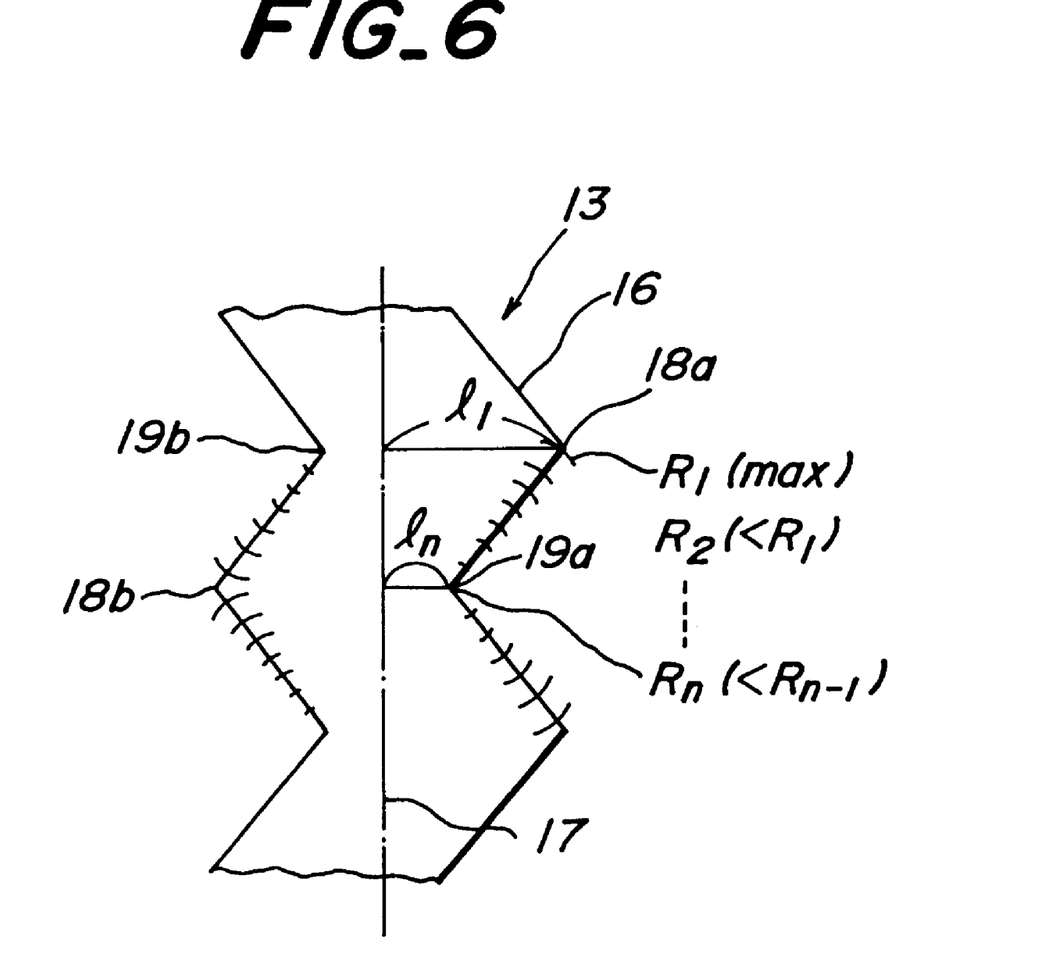
FIG. 6 is a partial diagrammatic view of another embodiment of the rib-shaped land according to the invention.

In FIG. 6 is shown a part of a typical zigzag rib-shaped land 13. As shown in FIG. 6, it has been found that the same effect as in the first aspect of the invention is obtained by subjecting each edge portion 16 of the same rib-shaped land 13 located at a boundary between a ground contact region and a side wall of the rib-shaped land to chamfering convexly outward in a radial direction of the tire at a curvature varied in accordance with a distance vertically drawn from a circumference position 17 of the tire equally dividing the rib-shaped land.

As seen from the above, in the second aspect of the invention, it is an essential feature that each edge portion 16 of the same rib-shaped land 13 located at a boundary between a ground contact region and a side wall of the rib-shaped land is subjected to chamfering convexly outward in a radial direction of the tire at a curvature varied in accordance with a distance vertically drawn from a circumference position 17 of the tire equally dividing the rib-shaped land. In this way, the friction force between the ground contact region of the tire and the road surface can effectively be enhanced to improve the running performances. Also, there is caused no degradation of the other properties such as the drainage property and the like.

In order to more uniformize the ground contact pressure in the rib-shaped land to further effectively enhance the friction force, it is preferable that the edge portion 19 of the rib-shaped land 13 is subjected to chamfering in such a manner that the radius of curvature $R_1$ in corners 18a, 18b most apart from the vertical distance from the circumference position 17 of the tire (distance:$1_1$) is maximum and the radius of curvature in the edge portions of the rib-shaped land 13 gradually decreases from the corners 18a, 18b toward corners 19a, 19b nearest to the vertical distance from the circumference position 17 (distance:$1_n$) and the radius of curvature $R_n$ in the corners 19a, 19b is minimum.

In order to more uniformize the ground contact pressure in the rib-shaped lands, it is preferable that the radius of chamfering curvature in the edge portion of the rib-shaped land 13a, 13d located at each side region of the tread is made larger than the radius of chamfering curvature in the edge portion of the rib-shaped lands 13b, 13c located at the central region thereof.

Figure 4:
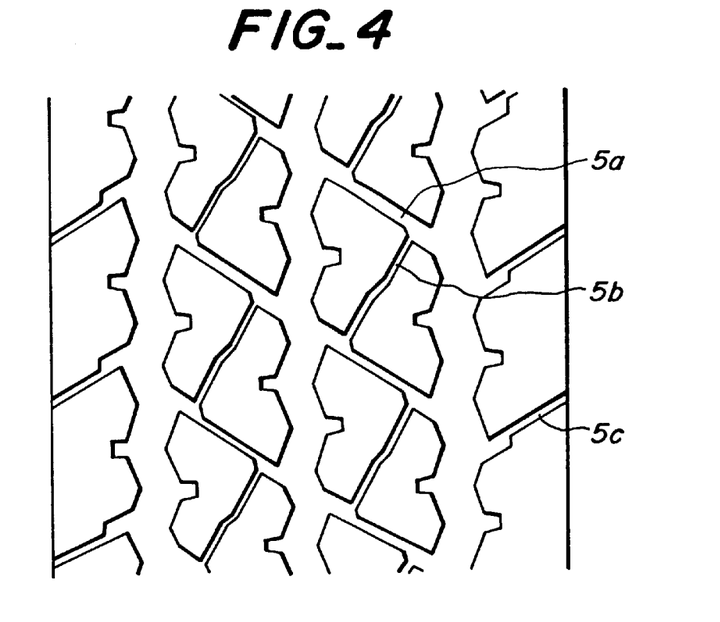
FIG. 4 is a diagrammatically partial plan view of another embodiment of the block pattern according to the invention.

Although the above is described with respect to only a preferred embodiment of the invention, various modifications may be taken within a scope of the invention. For example, the tire may have such a use embodiment that the tread portion indicates a block pattern defined by circumferential main zigzag grooves 14a–14c and auxiliary grooves 5a–5c having a shallow groove depth as shown in FIG. 4 at an initial worn stage of the tire but changes into a rib pattern having no auxiliary grooves 5a–5c as shown in FIG. 5 on and after middle worn stage of the tire. Also, although the edge portion of the land is subjected to chamfering at a convex curvature in the invention, if it is intended to further decrease the ground contact pressure, sipes may be disposed in the edge portion.

The following examples are given in illustration of the invention and are not intended as limitations thereof.

EXAMPLES (according to the first aspect of the invention)

Example 1

A tire of this example is a pneumatic radial tire for passenger car having a tread pattern as shown in FIG. 1 and a tire size of 195/165R14, in which an edge portion of a block-shaped land is subjected to chamfering in such a manner that a radius of curvature at the chamfering is 2.5 mm at a position corresponding to a maximum distance from the center position 10, and 0.5 mm at a position corresponding to a minimum distance from the center position 10, and gently changes within a range of 0.5–2.5 mm at other positions of the edge portion.

The structure of this tire other than the tread pattern is substantially the same as in the usual pneumatic radial tire for passenger car.

Example 2

A tire of this example is the same as in Example 1 except that edge portions of block-shaped land 6b other than block-shaped lands 6a located at the central region of the tread are subjected to chamfering in such a manner that a radius of curvature at the chamfering is 3.5 mm at a position corresponding to a maximum distance from the center position 10, and 0.5 mm at a position corresponding to a minimum distance from the center position 10, and gently changes within a range of 0.5–3.5 mm at other positions of the edge portion.

For comparison, there are provided a conventional tire in which edge portions of all block-shaped lands are not subjected to chamfering (Conventional Example 1) and another conventional tire in which edge portions of block-shaped land are subjected to chamfering at a radius of curvature of 1.5 mm (constant) over a full periphery (Conventional Example 2).

EXAMPLES (according to the second aspect of the invention)

Example 3

A tire of this example is a pneumatic radial tire for small-size truck having a tread pattern as shown in FIG. 5 and a tire size of 205/60R17.5, in which an edge portion of a rib-shaped land is subjected to chamfering in such a manner that a radius of curvature at the chamfering is 2.5 mm at a position corresponding to a maximum distance from the circumference position 17, and 1.0 mm at a position corresponding to a minimum distance from the circumference position 17, and gently changes within a range of 1.0–2.5 mm at other positions of the edge portion.

The structure of this tire other than the tread pattern is substantially the same as in the usual pneumatic radial tire for small-size truck.

Example 4

A tire of this example is the same as in Example 3 except that edge portions of rib-shaped lands 13a, 13d other than rib-shaped lands 13b, 13c located at the central region of the tread are subjected to chamfering in such a manner that a radius of curvature at the chamfering is 3.5 mm at a position corresponding to a maximum distance from the circumference position 17, and 1.0 mm at a position corresponding to a minimum distance from the circumference position 17, and gently changes within a range of 1.0–3.5 mm at other positions of the edge portion.

For comparison, there are provided a conventional tire in which edge portions of all rib-shaped lands are not subjected to chamfering (Conventional Example 3) and another conventional tire in which edge portions of rib-shaped land are subjected to chamfering at a radius of curvature of 1.5 mm (constant) over a full periphery (Conventional Example 4).

TEST METHOD

Each of the tires in Examples 1–2 and Conventional Examples 1–2 (internal pressure:2 kgf/cm$^2$) is mounted onto a front-wheel-drive type passenger car having a displacement of 2000 cc (two crewmen ridden on a front seat), while each of the tires in Examples 3–4 and Conventional Examples 3–4 (internal pressure:6 kgf/cm$^2$) is mounted onto a small-size truck (dual-wheel type as a rear wheel, maximum authorized freight mass: 2t at constant state). The tests for evaluating the braking performance, cornering property and straight running stability are carried out by actually running these vehicles.

The braking performance is evaluated from a value of a running distance measured when the vehicle is run at a speed of 50 km/h on an asphalt road surface of a wet state having no water depth and then rapidly braked to measure a running distance until the stop of the vehicle.

The cornering property is evaluated from a value of limit lateral gravity measured when the vehicle is run on a cornering test course having a radius of curvature of 50 m.

The straight running stability is evaluated by a professional driver's feeling when the vehicle is run at a speed of 100 km/h on a flat and dry asphalt road.

The results evaluated with respect to the passenger car tires are shown in Table 1, and the results evaluated with respect to the tires for small-size truck are shown in Table 2. In Tables 1 and 2, each value of the properties is represented by an index on the basis that Conventional Examples 2 and 4 are 100, respectively, in which the larger the index value, the better the property.

TABLE 1

|  | Braking performance | Cornering property | Stability straight running |
|---|---|---|---|
| Conventional Example 1 | 97 | 96 | 93 |
| Conventional Example 2 | 100 | 100 | 100 |
| Example 1 | 105 | 103 | 112 |
| Example 2 | 105 | 106 | 119 |

TABLE 2

|  | Braking performance | Stability straight running |
|---|---|---|
| Conventional Example 3 | 98 | 97 |
| Conventional Example 4 | 100 | 100 |
| Example 3 | 107 | 109 |
| Example 4 | 107 | 114 |

What is claimed is:

1. In a pneumatic tire comprising a tread portion having a plurality of block-shaped lands defined by a plurality of tread grooves formed in the tread portion, an improvement wherein each edge portion of the same block-shaped land located at a boundary between a ground contact region and a side wall of the block-shaped land is subjected to chamfering convexly outward in a radial direction of the tire at a plurality of curvatures continuously varied such that the curvature is proportional to a distance from a center position of the block-shaped land.

2. A pneumatic tire according to claim 1, wherein a radius of curvature in the edge portion of the same block-shaped land is increased in accordance with the distance from the center position of the block-shaped land.

3. A pneumatic tire according to claim 2, wherein said radius of curvature is a maximum at a corner position of said block-shaped land and gradually decreases toward positions closer to said center position.

4. A pneumatic tire according to claim 1, wherein a radius of chamfering curvature in the edge portion of a block-shaped land located at each side region of the tread portion is made larger than that in the edge portion of a block-shaped land located at the central region of the tread portion.

5. A pneumatic tire according to claim 1, wherein a radius of curvature in the edge portion of the same block-shaped land is decreased in accordance with the distance from the center position of the block-shaped land.

* * * * *